US012599260B2

(12) United States Patent
Benedict et al.

(10) Patent No.: US 12,599,260 B2
(45) Date of Patent: Apr. 14, 2026

(54) AUDIO APPARATUS IN DRINKWARE

(71) Applicants: Birch Rayner Benedict, Tallahassee, FL (US); Daniel Robert Stephens, Inyokern, CA (US)

(72) Inventors: Birch Rayner Benedict, Tallahassee, FL (US); Daniel Robert Stephens, Inyokern, CA (US)

( * ) Notice: Subject to any disclaimer, the term of this patent is extended or adjusted under 35 U.S.C. 154(b) by 143 days.

(21) Appl. No.: 18/674,868

(22) Filed: May 26, 2024

(65) Prior Publication Data

US 2025/0359692 A1 Nov. 27, 2025

(51) Int. Cl.
*A47G 19/22* (2006.01)
*H04R 1/02* (2006.01)

(52) U.S. Cl.
CPC ......... *A47G 19/2227* (2013.01); *H04R 1/028* (2013.01); *A47G 2019/2244* (2013.01); *A47G 2200/143* (2013.01); *A47G 2200/20* (2013.01)

(58) Field of Classification Search
CPC ........ A47G 19/2227; A47G 2019/2244; A47G 2200/143; A47G 2200/20; H04R 1/028
USPC .......................................................... 381/386
See application file for complete search history.

(56) References Cited

FOREIGN PATENT DOCUMENTS

| | | | | | |
|---|---|---|---|---|---|
| CA | 2894125 C | * | 3/2018 | | G16H 20/13 |
| CN | 205612031 U | * | 10/2016 | | |
| CN | 107736773 A | * | 2/2018 | | A47G 19/2272 |
| CN | 116348019 A | * | 6/2023 | | A47K 3/001 |
| CN | 118212949 A | * | 6/2024 | | G11C 7/16 |

* cited by examiner

*Primary Examiner* — Sean H Nguyen

(57) ABSTRACT

A user operated system for vibrating the contents of drinkware, such as a drinking bottle, thermos, drinking glass, drinking cup, drinking mug, etc. with user activated control circuitry. The user activates the apparatus through the chosen method of activation by push button, touch, app, wireless or Bluetooth™ technology. When the control circuitry is activated, a signal is sent to an audio delivery device. This audio delivery device is placed to vibrate and resonate the inner container, allowing for the transfer of vibrational and or resonating energy from the delivery device to the container and the contents of the container. The user then consumes the vibrated contents of the container for novelty or holistic purposes.

5 Claims, 6 Drawing Sheets

AUDIO APPARATUS IN DRINKWARE

CROSS-REFERENCE TO RELATED APPLICATIONS

The present application claims priority to U.S. provisional patent application No. 63/526,984, filed on Jul. 15, 2023, and U.S. provisional patent application No. 63/528,326, filed on Jul. 21, 2023, disclosures of which are incorporated herein at least by reference.

INVENTORS

Birch Rayner Benedict
Daniel Robert Stephens

BACKGROUND OF THE INVENTION

1. Field of the Invention

The present invention is in the field of Drinkware and pertains particularly to Drinkware with added internal mechanisms for novel use.

2. DISCUSSION OF THE STATE OF THE ART

In the market of Drinkware, there are no products that can vibrate the contents of Drinkware in items such as a thermos, glass, cup, coffee cup, etc. No product has been developed to bring the contents of these different Drinkware products to a specific vibrational rate for consumption.

The emerging market of new vibrational technologies has yet to be applied to Drinkware, specifically, thermoses, glasses, cups, coffee cups, etc.

The need for altering the vibrational properties of liquid contents of Drinkware by the invention discussed herein for Novelty or even Holistic purposes is unmet in today's marketplace. Therefore, what is clearly needed is a new method and types of Drinkware for consumers to have the option of bringing the contents of their thermos, glass, cup, coffee cup, etc. To a desired vibrational rate for novelty or holistic purposes.

SUMMARY OF THE INVENTION

In one embodiment of the invention a user-operated apparatus is manufactured into a Drinking Bottle comprising of control circuitry with non-wireless and or wireless capabilities. The communication circuitry, both non-wireless and wireless consists of a processor and memory, the memory storing the instructions and information and audio files that when executed by the processor, cause the processor to play audio/frequency files for a specified length, volume and or frequency. When the file is activated or played through a transducer, audio speaker or other audio delivery device, the inner container receives the vibrational and resonating energy from the transducer, speaker or other audio delivery device. This audio energy is transferred to the inner container. The user then consumes the contents of the inner container for novelty or holistic purposes.

Also, in one embodiment of the invention an apparatus is manufactured into a Drinking Glass comprising of control circuitry with Bluetooth™ technology. The communication circuitry is compatible with wireless Bluetooth™ technology. In this aspect of the invention the batteries are rechargeable.

In another aspect of the invention, an option for solar charging is available. In another embodiment of the invention the method of recharging is magnetic and in another aspect of the invention a charging plate is the preferred method of recharging.

In another embodiment, a network enabled communications appliance paired for wireless communications to the apparatus allowing the user to operate the desired method of wireless interaction such a Bluetooth™ technology.

In one embodiment of the method, a delivery device such as a transducer, speaker or other audio delivery device, alters the vibrational rate of the contents of a container via an apparatus having a processor and a memory, the memory has file containing audio, frequency or spoken words. A transducer or speaker or other audio delivery device. An activation button or method of activation such as touch or wireless communication and a container with the delivery device attached to or in close proximity to the inner container. The delivery device attached to, or in close proximity with the inner container allowing the transfer of the resonate and or vibrational energy from the delivery device to the container and therefore the contents of said container.

BRIEF DESCRIPTION OF THE DRAWING FIGURES

DETAILED DESCRIPTION

The present invention uses a unique combination audio components and Drinkware to allow the user the novel feature to vibrate the contents of all Drinkware such as a thermos, glass, cup, coffee cup, etc. for novelty or holistic purposes. The present invention is described in enabling detail in the following examples, which may represent more than one embodiment of the present invention.

Figure 1:
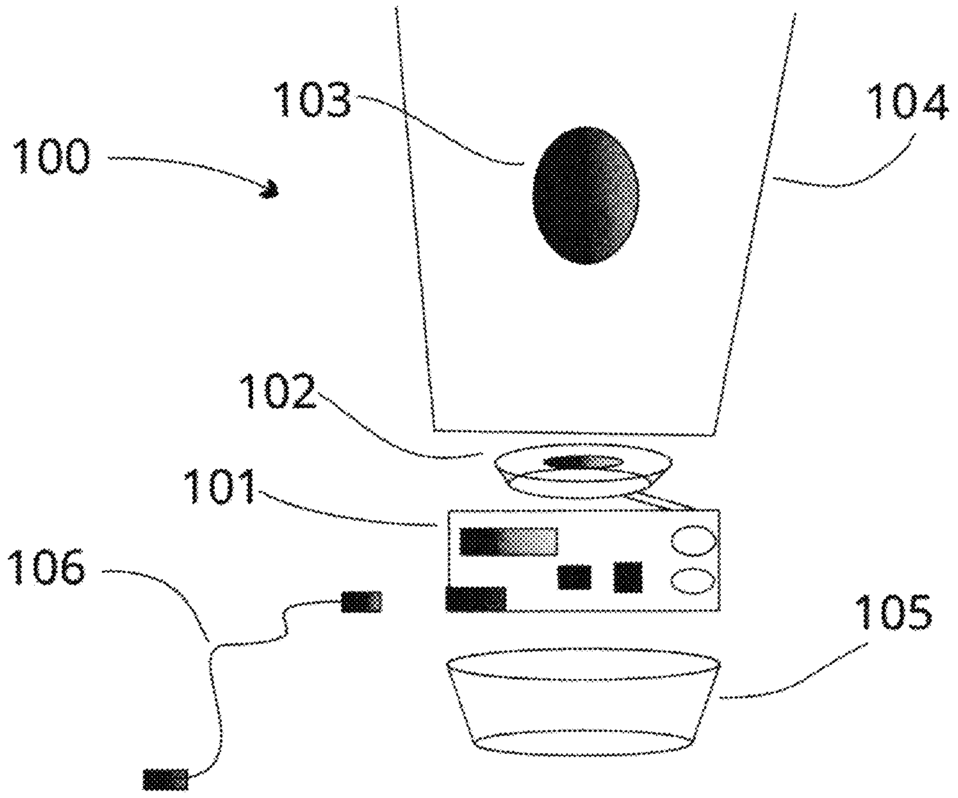
FIG. 1 is an exploded view of the apparatus with inner container according to an embodiment of the invention.

FIG. 1 is an exploded view of a drinking glass 100 with the components arranged as per the invention in a specific order, to vibrate the contents according to the embodiment of the present invention. Drinking glass 100 in this example has control circuitry 101 with a CPU/Microchip used to hold audio/frequency files. In this embodiment of the invention the control circuitry 101 with a CPU/Microchip is used to control all information and activation of files. A transducer or mini speaker 102 is connected to the control circuitry 101. A transducer or mini speaker 102 is the delivery source for the audio/frequency files to the inner container 104. The activation button 103 is pressed by the user to activate the audio/frequency file. In another embodiment of the present invention activation is wireless or via an app. The bottom/housing 105 holds and protects components from moisture and elements. 105 is where the charging port for USB or similar technology is located. In FIG. 1 this example of a USB cable 106 is for charging the control circuitry. In other embodiments of the invention the control circuitry is charged via magnetic charger or charging plate.

Figure 2:
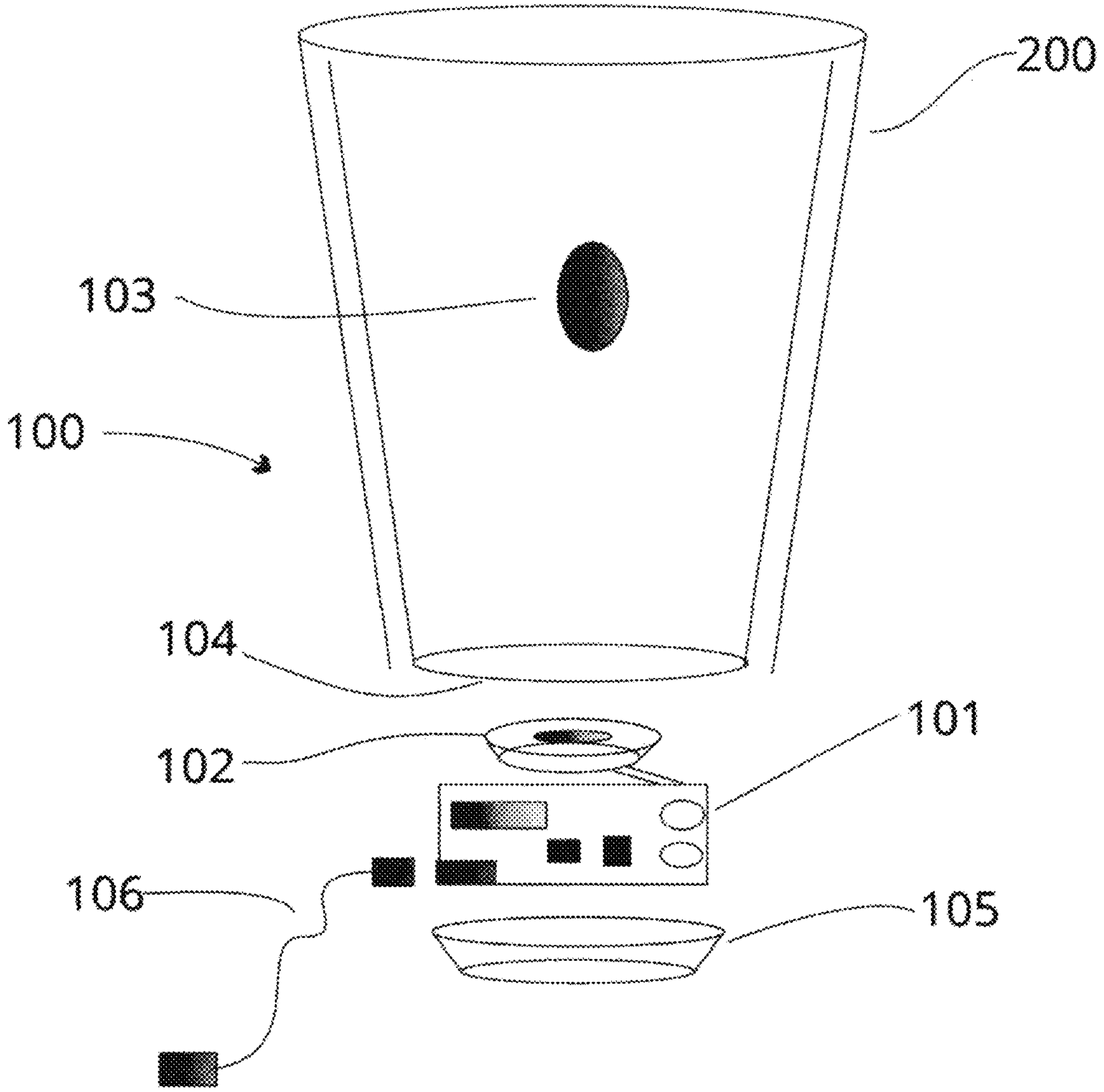
FIG. 2 is an exploded view of a drinking glass with apparatus, according to an embodiment of the invention.

FIG. 2 is an exploded view of a drinking glass with an outer shell 200. In this example the same components 101-106 from FIG. 1 are represented as needed the embodied invention to work.

Figure 3:
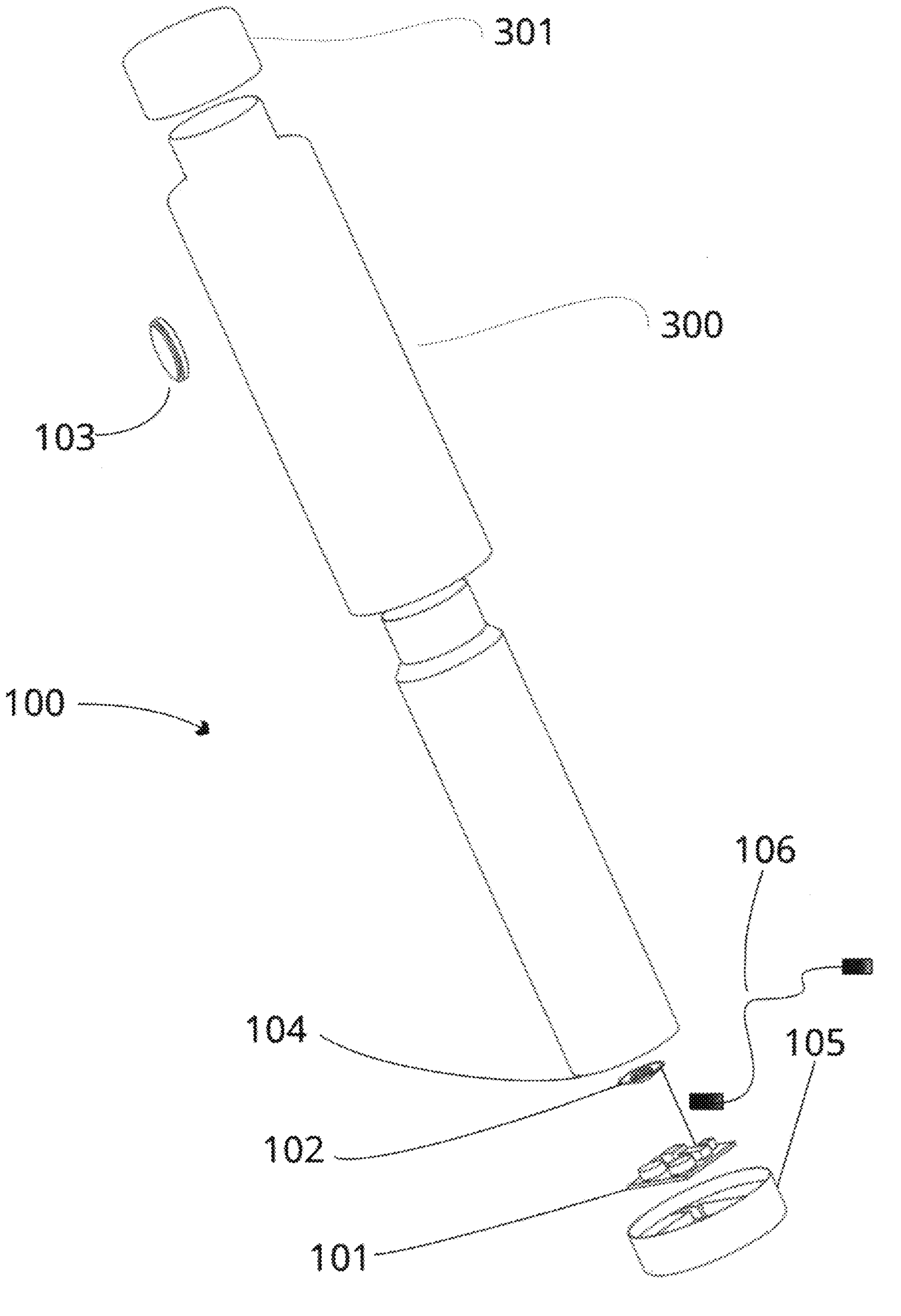
FIG. 3 is an exploded view of a drinking bottle of a drinking according to an embodiment of the invention.

FIG. 3 is an exploded view of a thermos/drinking/water bottle. In this example the embodied invention, the outer shell 300 holds the inner container 104 which holds the liquid to be introduced to the audio/frequency files from the control circuitry CPU/microchip 101. In this embodiment of the invention the activation button 103 is pressed by the user to activate the audio/frequency file. The transducer/mini speaker 102 receives a signal and while attached to inner container 104, vibrates the liquid contained within. The bottom protective cap/housing 105 is for protection and if needed, charging access if using USB or similar technology. In other embodiments of the invention the control circuitry is charged via magnetic charger.

Figure 4:
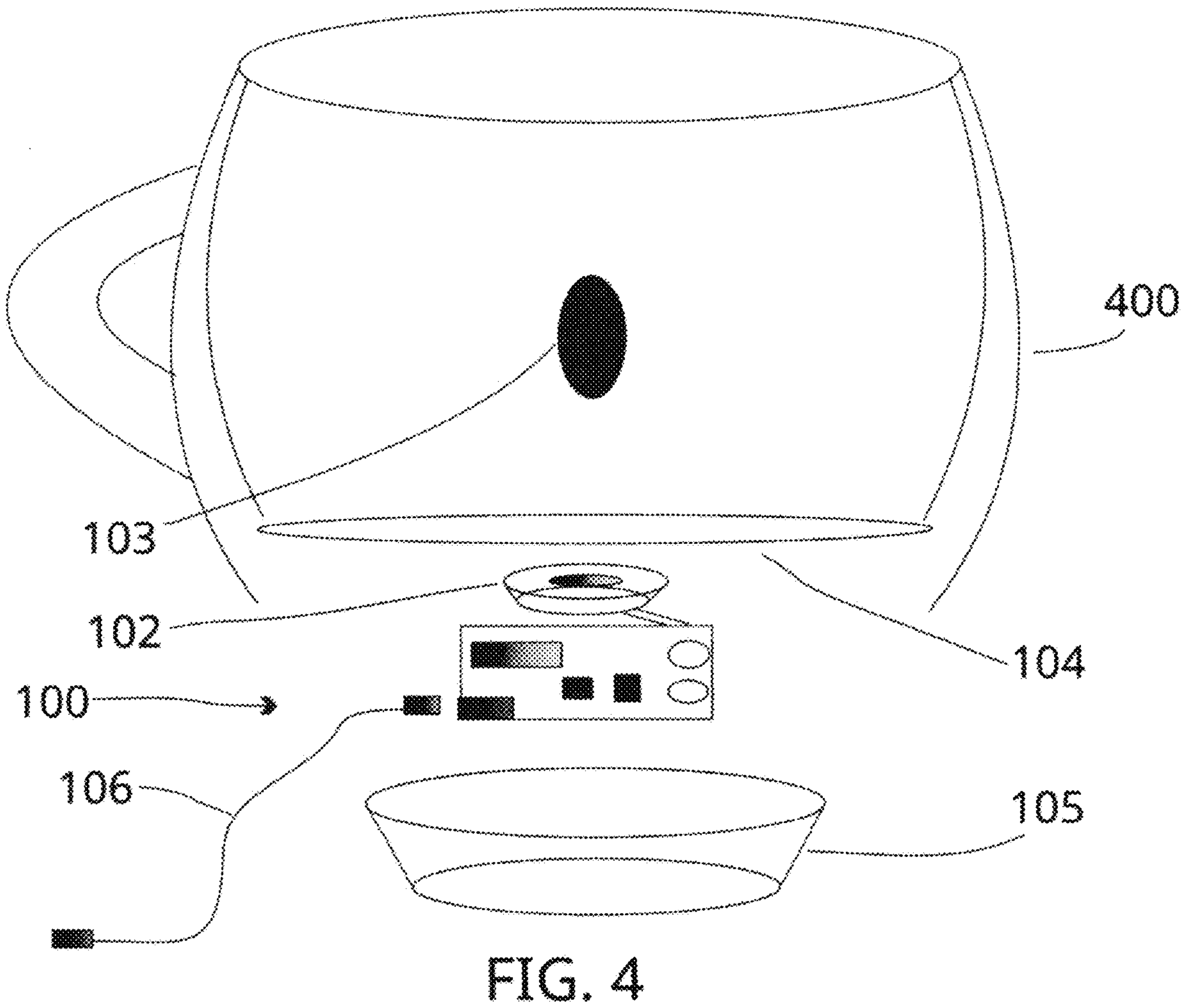
FIG. 4 is an exploded view of a drinking mug with apparatus, according to an embodiment of the invention.

FIG. 4 is an exploded view of a coffee mug outer shell 400. This figure is an example of how the embodied invention and method would be used for a mug/cup. All components 100-106 have the same function as the previous figure examples provided numbered 1, 2 and 3.

Figure 5:
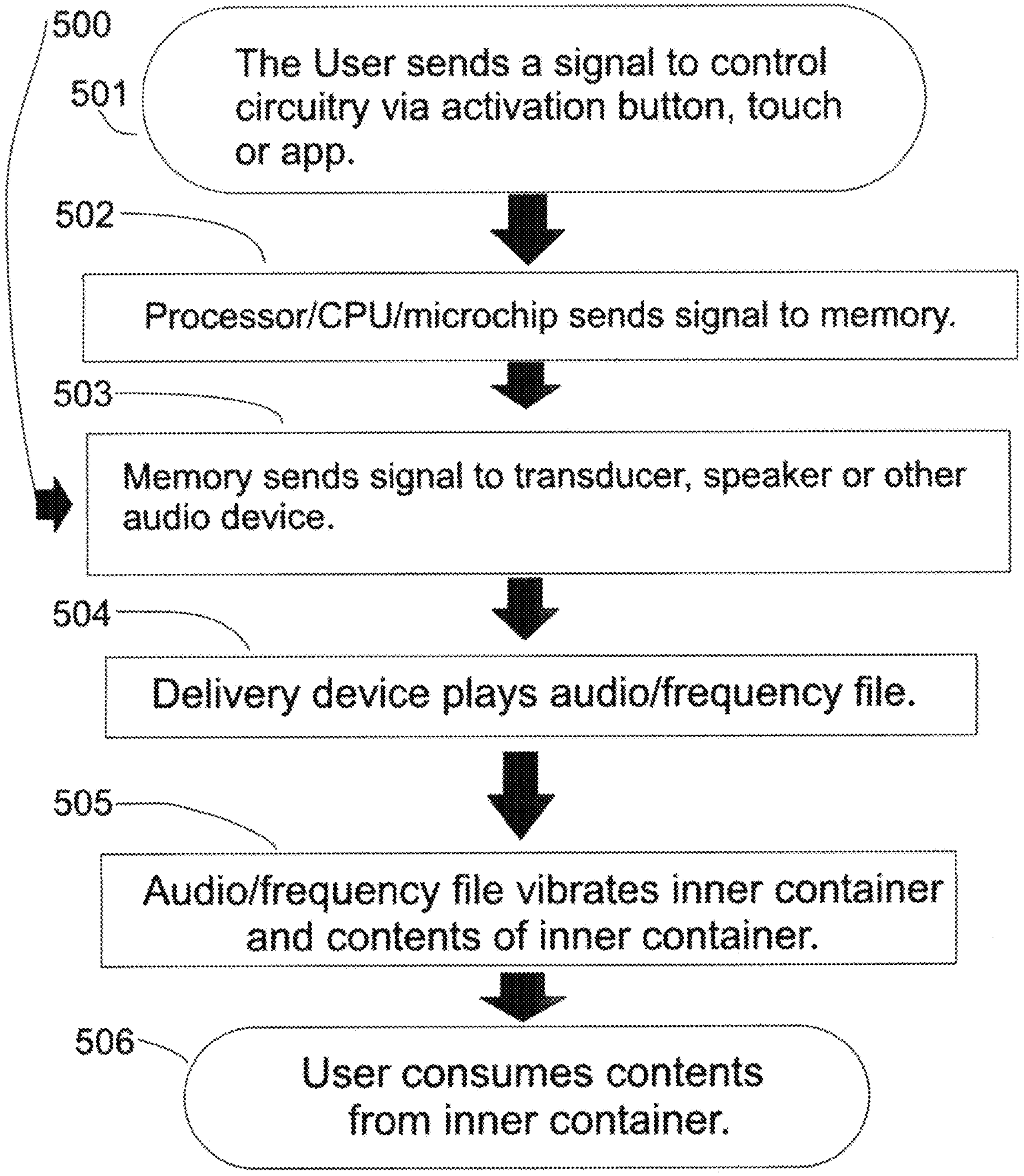
FIG. 5 is a flow chart with steps to use apparatus, according to an embodiment of the invention.

FIG. 5 is a process flow chart illustrating the steps 500 for use of the present embodied invention. At step 501, the user sends a signal to the control circuitry via activation button, touch or app. At step 502 the Processor/CPU/microchip control unit sends signal to memory. At step 503 memory sends signal to transducer, speaker or other audio device. At step 504 the delivery device plays the activated audio or frequency file. At step 505 the audio or frequency file vibrates/resonates the inner container, vibrating the contents. At step 506 the user consumes the vibrating liquid or contents.

Figure 6:
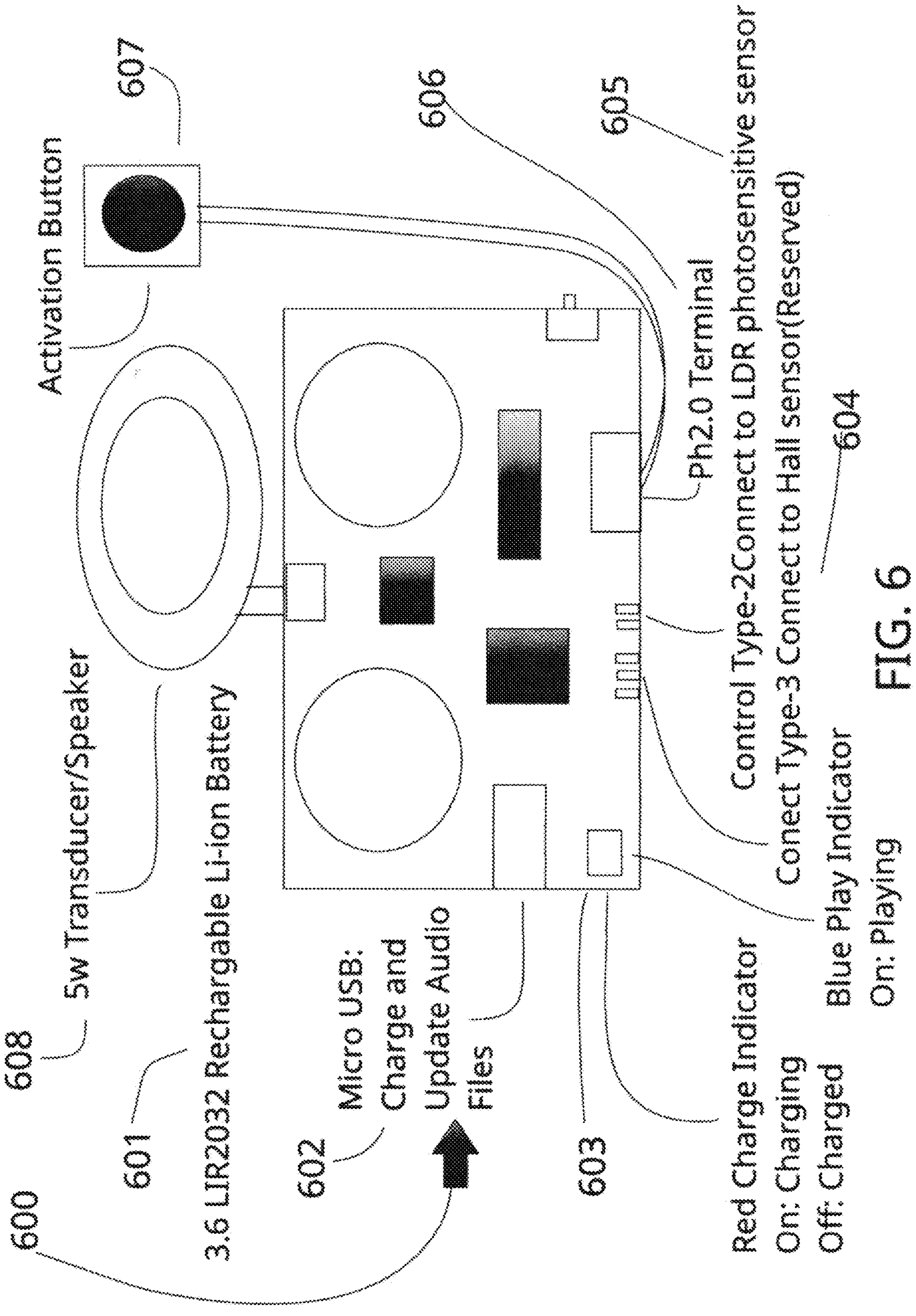
FIG. 6 is a top view of control circuitry and transducer as described in one embodiment of the invention.

FIG. 6 is a diagram of an example of the control circuitry 600 used in this embodiment of the invention, activation button 607 and transducer 608 or speaker. Item 601 is the power for the control circuitry by two 3.6 W LIR2023 Li-ion Batteries. The USB outlet/input 602 is for charging the control circuitry and to download updates to files. The indicator light 603 lets the user know the control circuitry is charged and if the file is currently playing. Alternate Control Type-3 sensor 604 and alternate Control Type-2 sensor 605 are reserved for different configurations other than illustrated in this example of the control circuitry for this embodiment of the invention. A PH2.0 Terminal 606 is for alternate charging methods for a different embodiment. In this example the Activation Button 607 sends signal to the control circuitry, Processor/CPU/microchip. The Processor/CPU/microchip then sends the audio/frequency signal to the 5w Transducer 608, which is the delivery device for the audio or frequency file in this example of the invention.

It is noted herein that the specific electronics control circuitry and components illustrated in this example is not to be construed as a limitation in the electronic architecture for enabling practice and method of the present invention. The inventors choose the type of components illustrated because of the simplicity and reliability. However, in other embodiments other electronics architectures include the use of different components, different connection types, integrated circuits (ICs) and charging methods.

It will be apparent to one with skill in the art of Drinkware design this invention may be provided using some or all of the mentioned features and components without departing from the spirit and scope of the present invention. It will also be apparent to the skilled artisan that the embodiments described above are specific examples of a single broader invention which may have greater scope than any singular description taught. There may be alterations made in the descriptions without departing from the spirit and scope of the present invention.

What is claimed is:

1. An audio apparatus for use with drinkware to vibrate contents of the drinkware, the audio apparatus comprising: an inner container configured to hold the contents; control circuitry having wired or wireless communication capabilities; a processor; and a memory storing instructions, information, and audio files, wherein the instructions, when executed by the processor in response to an activation signal received via an activation method selected from a button, touch input, wireless communication, or an application, cause the processor to: send a signal to an audio delivery device selected from a transducer, an audio speaker, or another audio delivery device to play the audio files or frequency files at a specified duration, volume, and frequency, wherein the audio delivery device transfers vibrational and resonating energy to the inner container and thereby to the contents, altering a vibrational state of the contents for holistic benefits by infusing Solfeggio frequencies, prayers, or chants.

2. The audio apparatus of claim 1, wherein the control circuitry comprises communication circuitry, and wherein the communication circuitry is wireless Bluetooth™ circuitry.

3. The audio apparatus of claim 1, wherein the audio files received in the memory are from a communication appliance, and wherein the communication appliance is one of a smart phone, smart watch, tablet device, smart eyewear (glasses), or wirelessly operated computer.

4. An audio apparatus comprising: a memory for storing files; and an inner container configured to hold contents, wherein upon receiving an activation signal from a network-enabled communication appliance paired for wireless communication with the audio apparatus, the files from the memory are played through an audio delivery device selected from a transducer, a speaker, or another audio delivery device, and wherein the audio delivery device is attached to or in close proximity to the inner container, allowing transfer of resonant and/or vibrational energy from the audio delivery device to the inner container and thereby to the contents to alter a molecular structure of the contents via targeted vibrations for holistic benefits.

5. A method comprising: altering a vibrational rate of contents of a container via an apparatus having control circuitry with a processor and a memory, wherein the memory has files containing audio, frequency, or spoken words; upon activation by an activation method such as a button, touch input, or wireless communication, sending a signal to the control circuitry, wherein the processor then sends the signal to an audio delivery device selected from a transducer, a speaker, or another audio delivery device which plays the files; and wherein the audio delivery device is attached to or in close proximity to an inner container of the apparatus, allowing transfer of resonant and/or vibrational energy from the audio delivery device to the inner container, facilitating transfer of the vibrational and resonating energy to the contents, wherein the files include Solfeggio frequencies configured to infuse the contents with energy for holistic purposes, such as altering the vibrational state of a liquid.

* * * * *